(12) United States Patent
Howe et al.

(10) Patent No.: US 8,668,384 B2
(45) Date of Patent: Mar. 11, 2014

(54) SYSTEM AND METHOD FOR DETECTING THE TEMPERATURE OF AN ELECTROPHORETIC DISPLAY DEVICE

(75) Inventors: Benjamin M. Howe, Plano, TX (US); Gary A. Frazier, Garland, TX (US)

(73) Assignee: Raytheon Company, Waltham, MA (US)

( * ) Notice: Subject to any disclaimer, the term of this patent is extended or adjusted under 35 U.S.C. 154(b) by 490 days.

(21) Appl. No.: 12/900,096

(22) Filed: Oct. 7, 2010

(65) Prior Publication Data
US 2012/0087389 A1 Apr. 12, 2012

(51) Int. Cl.
*G09G 5/00* (2006.01)
*G01K 11/20* (2006.01)
*G02F 1/00* (2006.01)

(52) U.S. Cl.
USPC .............. 374/142; 374/20; 374/28; 374/5; 374/161; 374/141; 374/183; 374/16; 359/267; 345/211

(58) Field of Classification Search
USPC .......... 374/141, 16, 28, 100, 4, 57, 130, 132, 374/161–162, 137, 166, 20, 112, 114, 5, 374/142, 183; 438/104; 345/211, 207, 345/105–107, 213; 359/265, 267, 245, 296
See application file for complete search history.

(56) References Cited

U.S. PATENT DOCUMENTS

| | | | |
|---|---|---|---|
| 6,657,447 B1 * | 12/2003 | Parandoosh | 324/750.03 |
| 6,972,732 B1 | 12/2005 | Nishikawa | |
| 7,119,759 B2 | 10/2006 | Zehner et al. | |
| 7,126,577 B2 | 10/2006 | Zhou et al. | |
| 7,126,743 B2 * | 10/2006 | Johnson et al. | 359/296 |
| 7,265,895 B2 * | 9/2007 | Miyazaki et al. | 359/296 |
| 7,538,757 B2 | 5/2009 | Zhou et al. | |
| 7,623,113 B2 | 11/2009 | Zhou et al. | |
| 7,760,419 B2 * | 7/2010 | Lee | 359/296 |
| 7,787,169 B2 * | 8/2010 | Abramson et al. | 359/267 |
| 7,791,489 B2 | 9/2010 | Gelbman et al. | |
| 7,816,864 B2 * | 10/2010 | Liang et al. | 313/512 |
| 8,232,955 B2 * | 7/2012 | Kwon | 345/101 |
| 2003/0102858 A1 * | 6/2003 | Jacobson et al. | 324/158.1 |
| 2005/0099672 A1 * | 5/2005 | Jacobson et al. | 359/296 |
| 2005/0231460 A1 * | 10/2005 | Zhou et al. | 345/107 |
| 2008/0030914 A1 * | 2/2008 | Jahelka et al. | 361/103 |
| 2009/0096745 A1 * | 4/2009 | Sprague et al. | 345/107 |
| 2009/0236042 A1 * | 9/2009 | Wada et al. | 156/345.43 |
| 2010/0090649 A1 * | 4/2010 | Sardat et al. | 320/118 |
| 2010/0201677 A1 * | 8/2010 | Takei et al. | 345/213 |
| 2011/0037787 A1 * | 2/2011 | Yoshiga | 345/690 |
| 2011/0234557 A1 * | 9/2011 | Yang et al. | 345/207 |
| 2011/0267333 A1 * | 11/2011 | Sakamoto et al. | 345/211 |
| 2012/0092319 A1 * | 4/2012 | van Veenendaal et al. | 345/211 |
| 2012/0239321 A1 * | 9/2012 | Normoyle et al. | 702/58 |
| 2013/0258448 A1 * | 10/2013 | Abe | 359/296 |

FOREIGN PATENT DOCUMENTS

| | | | |
|---|---|---|---|
| JP | 2011075999 A | * | 4/2011 |
| JP | 2012189762 A | * | 10/2012 |
| KR | 1017903 B1 | * | 3/2011 |

* cited by examiner

*Primary Examiner* — Gail Verbitsky
(74) *Attorney, Agent, or Firm* — Lando & Anastasi, LLP (57) ABSTRACT

An apparatus includes a temperature detector coupled to a conductive layer of an electrophoretic display device. The temperature detector is operable to measure a leakage current that is responsive to a temperature associated with the electrophoretic device and determine the temperature associated with the electrophoretic device based at least in part on the measured leakage current.

18 Claims, 4 Drawing Sheets

SYSTEM AND METHOD FOR DETECTING THE TEMPERATURE OF AN ELECTROPHORETIC DISPLAY DEVICE

FEDERALLY SPONSORED RESEARCH

This invention was made with U.S. government support under a contract awarded by an agency of the U.S. government (Contract No. and Agency Withheld). The U.S. government has certain rights in this invention.

TECHNICAL FIELD OF THE INVENTION

This invention relates to electronics and, more specifically, to electrophoretic display devices.

BACKGROUND OF THE INVENTION

Facets of the electronics industry benefit from various information that is displayed on electronic display devices. Accordingly, electrophoretic display devices have been developed to display information. These electrophoretic display devices, however, have proven inadequate in various respects.

SUMMARY OF THE DISCLOSURE

In accordance with the teachings of the present disclosure, disadvantages and problems associated with previous electrophoretic display devices can be reduced or eliminated by providing a system and method that detects the temperature of an electrophoretic display device.

According to one embodiment of the present disclosure, an apparatus includes a temperature detector coupled to a conductive layer of an electrophoretic display device. The temperature detector is operable to measure a leakage current that is responsive to a temperature associated with the electrophoretic device and to determine the temperature associated with the electrophoretic device based at least in part on the measured leakage current.

According to another embodiment of the present disclosure, a method includes measuring a leakage current that is responsive to a temperature associated with the electrophoretic device using a temperature detector coupled to a conductive layer of an electrophoretic display device and determining the temperature associated with the electrophoretic device based at least in part on the measured leakage current using the temperature detector.

Certain embodiments of the present disclosure may provide one or more technical advantages. A technical advantage of one embodiment includes detecting the temperature of an electrophoretic display device. The temperature may be measured by converting a measured leakage current associated with the electrophoretic display device to temperature. This may provide a more accurate estimate of the temperature than may be obtained by measuring the ambient air temperature surrounding the electrophoretic display device. Another technical advantage may include using a detected temperature of an electrophoretic display device to more accurately attain a desired reflective state. Another technical advantage may be that compensating for temperature variations may allow for more bits to be displayed in a grayscale and/or may allow for operation over a greater temperature range than conventional electrophoretic display devices.

Certain embodiments of the present disclosure may include none, some, or all of the above technical advantages. One or more other technical advantages may be readily apparent to one skilled in the art in view of the figures, descriptions, and claims of the present disclosure.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE INVENTION

Embodiments of the present invention and its advantages are best understood by referring to FIGS. 1 through 4, wherein like numerals refer to like and corresponding parts of the various drawings.

Figure 1:
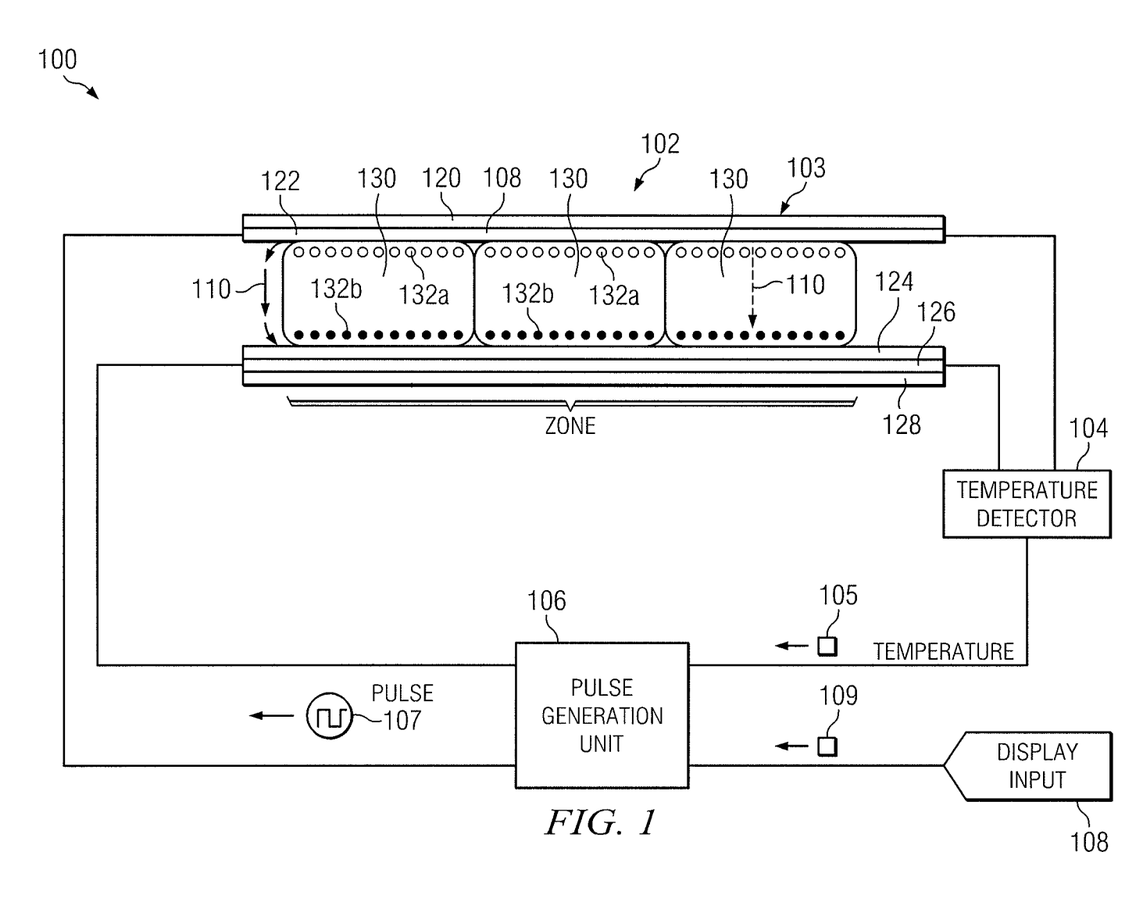
FIG. 1 is a block diagram illustrating an example embodiment of a system for detecting the temperature of an electrophoretic display device.

FIG. 1 is a block diagram illustrating an example embodiment of a system 100 for detecting the temperature of an electrophoretic display device 102. System 100 includes an electrophoretic display device 102, a temperature detector 104, a pulse generation unit 106, and a display input 108, coupled as shown. Electrophoretic display device 102 includes a viewing surface 103, a transparent layer 120, a conductive layer 122, an adhesive layer 124, a grounding layer 126, a backsheet 128, ink capsules 130, and pigment particles 132, arranged as shown. Electrophoretic display device 102 may include one or more zones, as shown.

In general, system 100 uses temperature detector 104 to detect the temperature of electrophoretic display device 102. For example, temperature detector 104 may be coupled to conductive layer 122 and/or grounding layer 126, such that temperature detector 104 may measure leakage current 110. Leakage current 110 is generally responsive to temperature variations associated with electrophoretic display device 102. Based on the measured leakage current 110, temperature detector 104 may determine a temperature of electrophoretic display device 102 and generate temperature information 105. System 100 may then use pulse generation unit 106 to display information on electrophoretic display device 102. Pulse generation unit 106 may display information based in part on detected temperature information 105, which may thereby compensate for temperature variations of electrophoretic display device 102. Displayed information may represent one or more combinations of various desired reflective states of viewing surface 103, including any number and/or shades of colors, such as a grayscale.

Electrophoretic display devices, such as electrophoretic device 102, are generally capable displaying various reflective states at a viewing surface. These devices operate by applying pulses of various amplitudes and/or wavelengths to ink capsules that include electrically charged pigment particles. The pigment particles may be various colors with different electrical charges, such as positively charged white pigment particles and/or negatively charged black pigment particles. When a pulse is applied, particles of one color may be attracted to the viewing surface and particles of another color may be repelled from the viewing surface. The resulting concentration of pigment particles at the viewing surface produces a net change in optical reflectivity of the display device. Accordingly, waveforms of various amplitudes and wavelengths may be applied to yield various shades between color pigments. For example, an electrophoretic display device may be capable of displaying two or more bits of a grayscale. After a pulse drives the display device to a given shade of reflectivity, the pigment particles generally remain suspended in place until the next pulse is applied.

Generally, the viscosity and electrodynamics of electrophoretic display devices are highly temperature dependent. Accordingly, the pulse and/or waveform required to achieve a particular desired reflective state may be dependent on the temperature of the electrophoretic device. A pulse operable to achieve a desired reflective state at one temperature may result in an undesired reflective state at a different temperature. Humidity similarly affects electrophoretic displays. For these and similar reasons, certain known electrophoretic display devices may not be capable of accurately displaying information and/or reflective states across a wide temperature range. In addition, temperature variations may limit the number of bits in a grayscale that can be accurately displayed. Accordingly, system 100 that detects the temperature of electrophoretic display device 102 may substantially reduce and/or eliminate these limitations and problems.

Electrophoretic display device 102 represents any combination of structure, materials, hardware, software, and/or controlling logic operable to display information at viewing surface 103. Electrophoretic display device 102 may be operable to display images, video, text, and other information. While depicted as including various elements, it should be understood that the illustrated embodiment of electrophoretic display device 102 is provided by way of example only and may include any number and configuration of elements and other materials operable to form a viewing surface 103 of an appropriate area and resolution.

Electrophoretic display device 102 may include one or more temperature zones, each zone associated with a temperature detector 104 operable to detect the temperature associated with that zone. The illustrated portion of electrophoretic display device 102 comprises one temperature zone and one temperature detector 104. It should be understood, however, that in various embodiments, electrophoretic display device 102 includes multiple zones, each with one or more temperature detectors, as described in greater detail with respect to FIGS. 4a and 4b.

Temperature detector 104 represents any combination of structure, materials, hardware, software and/or controlling logic operable to detect the temperature of electrophoretic display device 102. Temperature detector 104 may include circuit elements operable to measure leakage current 110 and determine the temperature associated with electrophoretic display device 102 based on the measured leakage current 110. Temperature detector 104 may transmit temperature information 105, which may include the determined temperature, to pulse generation unit 106. An example of temperature detector 104 is described in greater detail with respect to FIG. 2 below. Measuring and converting leakage current 110 to temperature may provide a more accurate estimate of temperature than other temperature measurement techniques. For example, a thermistor placed in proximity to an electrophoretic display device may heat and cool at different rates than the electrophoretic display itself due to sunlight, shade, air currents, and other environmental factors. As a result, temperatures detected by a thermistor in proximity to an electrophoretic display device may not be accurate. Converting a measured leakage current 110 to temperature, however, may accurately measure temperature of electrophoretic display device 102 even when exposed to radiative, convective, and conductive heating and cooling from external sources.

Pulse generation unit 106 represents any combination of structure, materials, hardware, software, and/or controlling logic operable to control the reflectivity of viewing surface 103. Pulse generation unit 106 may receive display information 109 from display input 108. In addition, pulse generation unit 106 may receive temperature information 105 from temperature detector 104. Based on display information 109 and temperature information 105, pulse generation unit 106 may generate and/or apply pulse 107 of various amplitudes and/or wavelengths to attain a desired reflective state of viewing surface 103. For example, pulse generation unit 106 may apply a pulse to conducting electrode 122 and grounding electrode 126. Pulse generation unit 106 may determine one or more desired reflective states based on display information 109. Accordingly, pulse generation unit 106 may be capable of driving the reflective states of various ink capsules 103 with various pulses 107 such that the image, video, text, or other information is displayed at viewing surface 103. An example of pulse generation unit 106 is described in greater detail with respect to FIG. 2 below.

Display input 108 represents any combination of hardware, software, and controlling logic operable to form an interface capable of receiving display information. For example, display input 108 may receive display information 109 from a camera, personal computer, personal digital assistant, or other source of display information. In some embodiments, display information 109 received from display input 108 includes information that represents an image, video, text, or other information. Alternatively or in addition, display information 109 may include one or more desired reflective states of ink capsules 130.

Electrophoretic display device 102 may include various elements. Transparent layer 120 represents any dimension of transparent material, such as plastic or glass, operable to allow pigment particles 132 to be viewed at viewing surface 103. Conductive layer 122 and grounding layer 126 represent electrical nodes, or electrodes, operable to apply a pulse across ink capsule 130. For example, conductive layer 122 may form a positive electrode and grounding layer 126 may form a negative and/or grounding electrode. Adhesive layer 124 represents any combination of structure and materials necessary to adhere ink capsules 130 to grounding electrode 126. Back sheet 128 represents any combination of structure and materials operable to form a foundation and/or backing layer of electrophoretic display device 102.

Ink capsules 130 represent any appropriate configuration of conductive material operable to encapsulate pigment particles 132. Ink capsules 130 may be generally capable of allowing migration of pigment particles 132 while a pulse is applied. In various embodiments, ink capsules 130 may be arranged in a grid or other suitable pattern. In addition or in the alternative, ink capsules 130 may be generally capable of suspending pigment particles 132 in place when a pulse is not being applied. In some embodiments, each ink capsule 130 may represent a pixel or other color unit of electrophoretic display device 102. Accordingly, the number of ink capsules 130 in an embodiment of electrophoretic display device 102 may represent the resolution of the electrophoretic display device 102.

Pigment particles 132 represent multi-colored particles that may be positively or negatively charged. For example, pigment particles 132 may include negatively charged white particles and positively charged black particles. Pigment particles 132 are generally operable to migrate towards and away from viewing surface 103 in response to pulses 107 applied to ink capsules 130 through electrodes 122 and 126.

Leakage current 110 represents a current associated with electrophoretic device 102. Leakage current 110 may represent a waste current and/or otherwise undesirable current that may be created as a byproduct of the electrical characteristics of electrophoretic display device 102. Leakage current 110 may represent a current that migrates from conductive layer 122 to grounding layer 126. For example, leakage current 110 may migrate through and/or around ink capsule 130, as illustrated. In various embodiments, leakage current 110 may be relatively minor as compared to currents that are associated with pulse 107. In many embodiments, the amount of leakage current 110 is responsive to the temperature of electrophoretic display device 102. The dependency of leakage current 110 on temperature may be caused by the relationship of voltage, current, and resistance to temperature. As the temperature of electrophoretic display device 102 changes, the resistivity of ink capsules 130 changes accordingly. Thus, the amount of leakage current 110 associated with electrophoretic display device 102 may be measured and used to determine the temperature of electrophoretic display device 102. For example, in an exemplary embodiment of electrophoretic display device 102, leakage current 110 may vary based on temperature variations of elements of electrophoretic display device 102 such as electrodes 122 and 126, ink capsules 130, and/or pigment particles 132. Leakage current 110 may depend on the size of the display and other environmental factors. In some embodiments, leakage current 110 may be measured in microamperes.

In operation, system 100 uses temperature detector 104 determine temperature information 105 associated with electrophoretic display device 102. For example, temperature detector 104 may measure leakage current 110 and convert the measured leakage current 110 to temperature information 105. Pulse generation unit 106 may receive display information 109 and temperature information 105. Based on display information 109 and temperature information 105, pulse generation unit 106 may generate one or more pulses 107 to change the reflective state of viewing surface 103. The details of these operations will be discussed in more detail with respect to FIG. 2 below.

Figure 2:
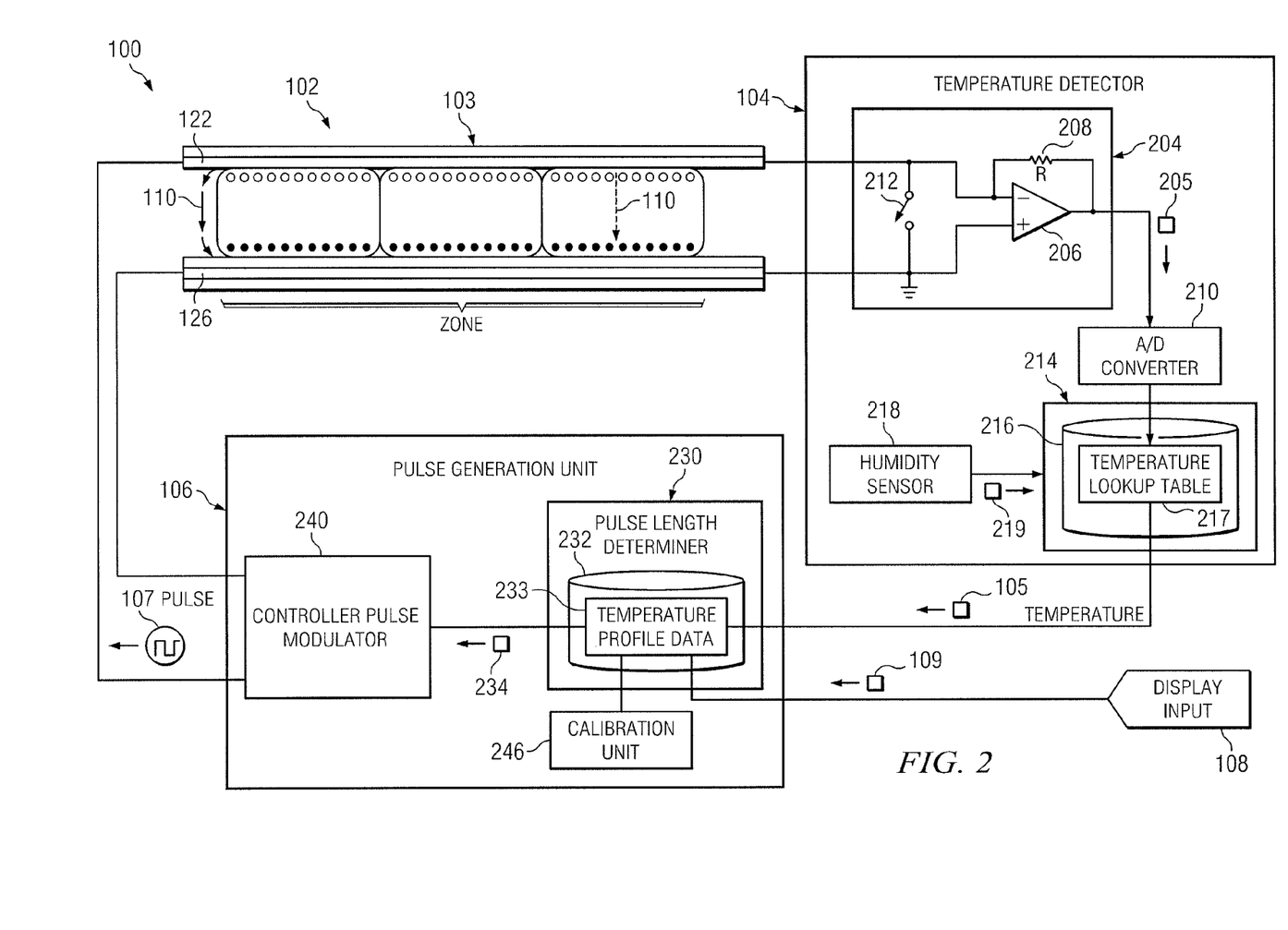
FIG. 2 is a block diagram illustrating another example embodiment of system for detecting the temperature of an electrophoretic display device.

FIG. 2 is a block diagram illustrating another example embodiment of system 100 for detecting the temperature of an electrophoretic display device 102. As previously described, system 100 includes electrophoretic display device 102, temperature detector 104, pulse generation unit 106, and display input 108. While it should be understood that any combination of hardware, software, and/or controlling logic may be appropriate, examples of embodiments of temperature detector 104 and pulse generation unit 106 are described as illustrated.

Temperature detector 104 includes a current detecting unit 204, an analog-to-digital (A/D) converter 210, a temperature determiner 214, and a humidity sensor 218. Pulse generation unit 106 includes a pulse length determiner 230, a controller pulse modulator 240, and a calibration unit 246.

Current detecting unit 204 represents any combination of hardware, software, and/or controlling logic operable to detect and/or measure a leakage current 110 that is associated with electrophoretic display device 102. Current detecting unit 204 includes any appropriate resistor 208, a transimpedance operational amplifier (op-amp) 206, and a switch 212 operable to measure leakage current 110. In an exemplary embodiment, resistor 208 and op-amp 206 may form a current-to-voltage converter, where the size of the resistor may determine an output voltage.

The various elements of current detecting unit 204 may be arranged in any suitable manner operable to measure leakage current 110. For example, current detecting unit 204 may include leads coupled to conductor layer 122 and grounding layer 126 of electrophoretic display device 102. Conductive layer 122 may be coupled to the negative input of op-amp 206 and to one end of resistor 208. Grounding layer 126 may be coupled to the positive input of op-amp 206 and to ground. The output of op-amp 206 may be coupled to the opposite end of resistor 208 and/or may be coupled to an analog input of an appropriate A/D converter 210. In some embodiments, switch 212 is coupled to the positive and negative inputs of op-amp 206.

Switch 212 may be any suitable switch operable to cease measuring the leakage current when electrophoretic display device 102 is undergoing a change of a reflective state and/or when a pulse 107 is being applied. For example, switch 212 may be closed at the start of pulse 107, thereby preventing current detecting unit 204 from measuring leakage current 110 for the duration of pulse 107. Accordingly, when pulse 107 ceases, switch 107 may be opened, thereby allowing current detecting unit 204 to measure leakage current 110 after the duration of pulse 107.

A/D converter 210 represents any suitable analog-to-digital converter of a suitable bit size and precision to digitize measured leakage current 205. For example, A/D converter may be suitable to accurately digitize a measured leakage current 205 that corresponds to a leakage current 110 that may be in the microampere range.

Temperature determiner 214 includes any suitable combination of hardware, software, and/or controlling logic operable to convert measured leakage current 205 to temperature information 105. For example, temperature determiner 214 may include one or more memory units, processors, and/or interfaces. In some embodiments, temperature determiner 214 includes a memory 216 operable to store a temperature lookup table 217 that correlates measured leakage current 205 to temperature information 105. Temperature lookup table 217 may store a temperature profile that includes measured leakage currents at each of various temperatures in a temperature range. Accordingly, temperature determiner 214 may look up the temperature information 105 in the table that corresponds to a given measured leakage current 205. In some embodiments, temperature lookup table 217 may store one or more temperature profiles that correlate humidity values and leakage current values to temperature. For example, each temperature profile can correlate current with temperature for a particular humidity value. Temperature determiner 214 may determine the humidity, then use the temperature profile for that humidity.

Humidity sensor 218 represents any suitable sensor operable to sense an ambient humidity associated with electrophoretic device 102. Humidity sensor 218 may transmit a measured humidity 219 to temperature determiner 214. In some embodiments, humidity sensor 218 may be encapsulated with similar materials as are used to encapsulate materials in electrophoretic display device 102 such that the measured humidity 219 may track with the humidity within electrophoretic display device 102.

Pulse length determiner 230 includes any suitable combination of hardware, software, and/or controlling logic operable to determine pulse length information 234 based on temperature information 105 and one or more desired reflective states included in display information 109. For example, pulse length determiner 230 may include one or more memory units, processors, and/or interfaces. In some embodiments, pulse length determiner 230 includes a memory 232 operable to store temperature profile data 233. Temperature profile data 233 may include an interpolated 2D lookup table. For example, temperature profile data 233 may store information that correlates actual reflective states achieved at various temperatures based on various pulse lengths applied at those temperatures. In other words, pulse length determiner 230 may look up a pulse length calculated to achieve a desired reflective state at a given temperature based on the previously determined actual reflective state at that temperature. Thus, various pulse length durations are each a function of one or more of many desired reflective states at one or more of many given temperatures. In some embodiments, temperature profile data 233 may include information similar to the information illustrated by FIG. 3, described in greater detail below.

Controller pulse modulator 240 includes any suitable combination of hardware, software, and/or condoning logic operable to generate one or more pulses 107 to change the reflective state to one or more desired reflective states included in display information 109. Controller pulse modulator 240 may include one or more memory units, processors, and/or interfaces. Pulse modulator 240 may be capable of applying multiple pulses in sequence or in parallel such that information 109 may be displayed at viewing surface 103, as previously described.

Calibration unit 246 includes any suitable combination of hardware, software, and/or controlling logic operable to calibrate electrophoretic display device 102 by storing temperature information in temperature lookup table 217 and/or temperature profile data 233. For example, calibration unit 246 may be capable of storing a number of measured leakage currents at various temperatures in temperature lookup table 217. In various embodiments, calibration unit 246 may use an alternative temperature measurement device, such as a thermistor, to measure the various temperatures used in the calibration process. As another example, calibration unit 246 may be capable of storing a number of achieved reflective states that correspond to various temperatures, humidity levels, and/or pulse length durations in temperature profile data 233.

Calibration unit 246 may generate and/or store temperature lookup table 217 and/or temperature profile data 233 during a testing phase of electrophoretic display device 102. In addition or in the alternative, calibration unit 246 may include an interface operable to receive information such as temperature lookup table 217 and/or temperature profile data 233. In some embodiments, such information may be loaded and/or stored based on predetermined electromechanical characteristics of electrophoretic display device 102. In some embodiments, calibration unit 246 may be capable of initiating a calibration process in which a user or other person may be prompted to provide feedback regarding reflective states and/or to set ambient temperatures and/or humidity such that calibration unit 246 may collect temperature, humidity, and/or reflective state information.

In operation, temperature detector 104 may determine a temperature associated with electrophoretic display device 102. Current detecting unit 204 of temperature detector 104 may measure leakage current 110 associated with electrophoretic display device 102. Measured leakage current 205 may be digitized by A/D converter 210 and/or may be transmitted to temperature determiner 214. In some embodiments, humidity sensor 218 measures ambient humidity and submits measured humidity 219 to temperature determiner 216.

Based on measured leakage current 205 and/or measured humidity 219, temperature determiner 216 may look up temperature information 105 in temperature lookup table 217 to determine the temperature. Temperature determiner 216 may then transmit temperature information 105 to pulse generation unit 106. In some embodiments, temperature detector 104 uses switch 212 to cease measuring leakage current 110 when a pulse 107 is being applied to change the reflective state of electrophoretic display device 102. In addition or in the alternative, temperature detector 104 may determine temperature intermittently and/or at a predetermined sampling rate.

Pulse generation unit 106 may attain a desired reflective state by applying a pulse 107 the electrophoretic display device 102. Pulse generation unit may compensate for temperature of electrophoretic display device 102 using temperature information 105. Pulse length determiner 230 may receive temperature information 105 and display information 109. Pulse length determiner 230 may determine the duration and/or waveform of pulses 107 based on one or more desired reflective states included in display information 109 received from display input 108 and temperature information 105. Pulse length determiner 230 may correlate one or more desired reflective states and the temperature information 105 to determine pulse length information 234. For example, pulse length determiner 230 may look up an appropriate pulse length duration and/or waveform in temperature profile data 232 stored in memory 233. Once pulse length information 234 is determined from temperature profile data 233, pulse length determiner 230 may transmit pulse length information 234 to controller pulse modulator 240. Based on the pulse length information 234, controller pulse modulator 240 generates one or more pulses 107 of appropriate waveforms and durations to attain the desired reflective states at viewing surface 103. Pulses 107 may be applied to conductive layer 122 and grounding layer 126 of electrophoretic display device 102. In some embodiments, calibration unit 246 may calibrate temperature detector 104 and pulse generation 106 such that the temperature associated with measured leakage current and desired reflective states can be adjusted in order to more accurately measure temperature and/or achieve desired reflective estates.

Figure 3:
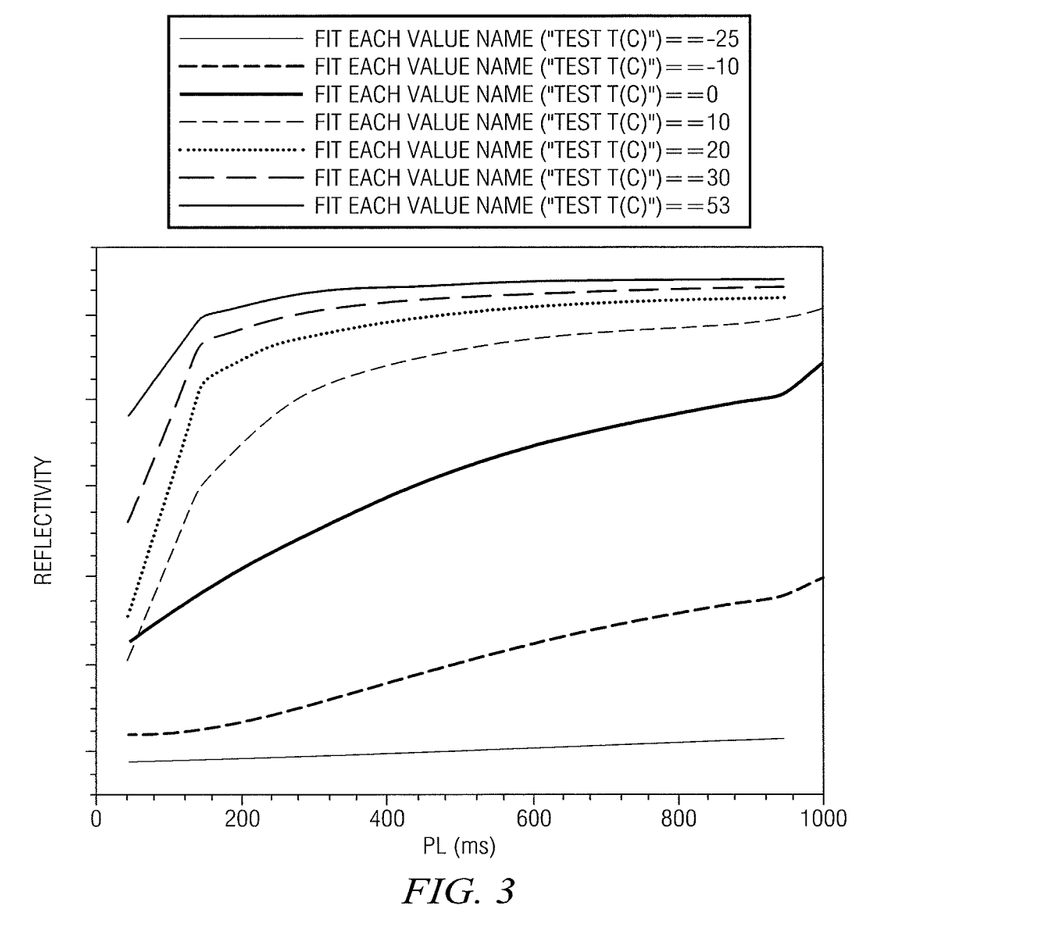
FIG. 3 is a chart illustrating examples of temperature profile data that may be used in a temperature compensated electrophoretic display device.

FIG. 3 is a chart illustrating exemplary temperature profile data 233 that may be used in temperature compensated electrophoretic display device 102. The X axis represents various pulse lengths, and the Y axis represents a scale of achieved reflectivity. Each line of the graph represents the reflectivity achieved by applying pulses of various wavelengths at each of a number of discrete temperatures. While a number of discrete temperatures are shown, it should be understood that any number of temperatures and corresponding pulse lengths/achieved reflective states may be stored in temperature profile data 233. Accordingly, a range of temperatures may be stored such that a gray scale of up to six and/or more bits may be achieved over the range of temperatures.

According to the teachings of the present disclosure, pulse link determiner 230 may use the correlation between achieved reflective state, temperature, and pulse length, as demonstrated by this chart and/or stored in temperature profile data 233, to determine a pulse length calculated to achieve one or more desired reflective states at any of various temperatures. It should be understood that this graph is merely a representation of exemplary data that may be stored and is provided to aid the reader's understanding of the present disclosure.

Figure 4A:
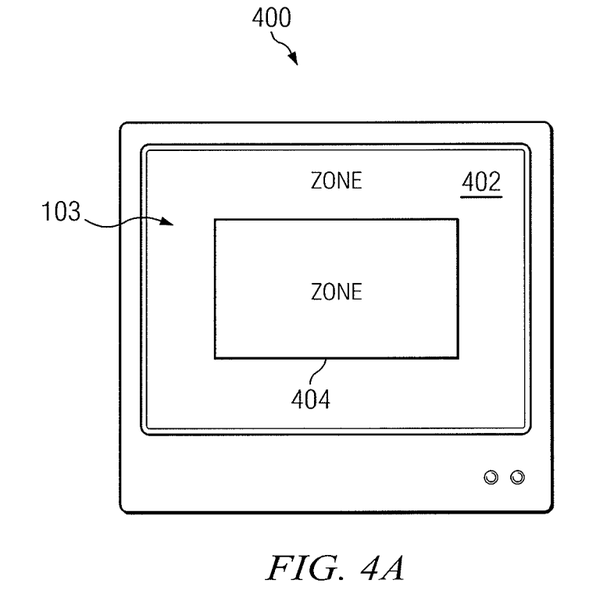
FIGS. 4A and 4B illustrate examples of systems for detecting temperatures of electrophoretic display devices that include temperature zones.
Figure 4B:
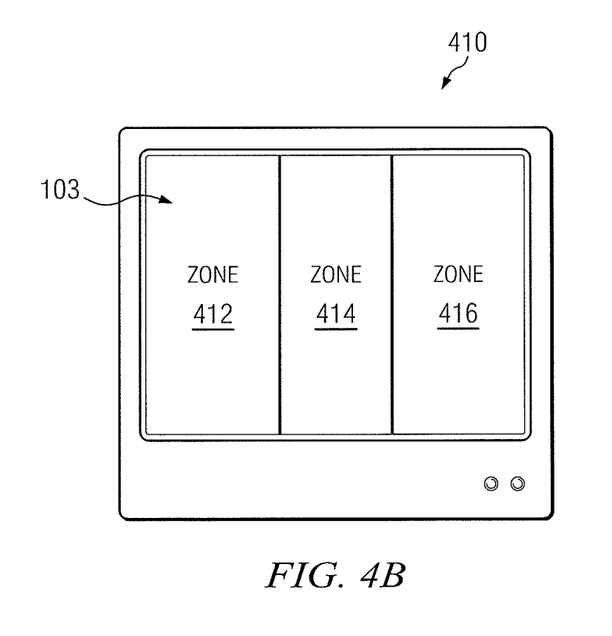

FIGS. 4A and 4B illustrate exemplary systems for detecting temperatures of electrophoretic display devices that include temperature zones. Temperatures across the screen of an electrophoretic display device may not be uniform. For example, temperatures across a viewing surface may vary according to the manner in which an electrophoretic display device is mounted, the ambient surroundings of the device, and/or other various electromechanical characteristic. Accordingly, electrophoretic display devices 400 and 410 may comprise various temperature zones. Each zone 402, 404, 412, 414, and/or 416 may include one or more temperature detectors that detect the measured leakage current associated with that zone. The temperature detectors associated with each zone may thereby determine the temperature associated with that zone. Thus, pulses applied to various areas of the viewing surface 103 may take into account the regional temperature of the electrophoretic display device. The use of zones may allow temperature compensated pulse 107 to more accurately achieve desired reflective states that display information 109.

The geometries of various zones may be determined based on predetermined temperature gradients across viewing surface 103. For example, zones 402 and 404 may be appropriate for an electrophoretic display device 400 that may be subject to environmental conditions that cause regions near to the perimeter of display surface 103 to be exposed to higher and/or lower temperatures than the inner regions. As another example, zones 412, 414, and 416 may be appropriate for an electrophoretic display device 410 that may be subject to environmental conditions that cause regions along two sides of viewing surface 103 to be exposed to higher and/or lower temperatures. In some embodiments, zones may be customized by a user based on particular temperature gradients being experienced by a given electrophoretic display device. It should be understood that while specific configurations of zones are illustrated, any number of zones may be utilized in order to account for a temperature gradient across a electrophoretic display device.

Modifications, additions, or omissions may be made to the systems and apparatuses disclosed herein without departing from the scope of the invention. The components of the systems and apparatuses may be integrated or separated. For example, temperature detector 104 and pulse generation unit 106 may be integrated onto a single integrated circuit board. Alternatively, various elements of temperature detector 104 may be included as elements of pulse generation unit 106, and vice versa. Moreover, the operations of the systems and apparatuses may be performed by more, fewer, or other components. For example, temperature lookup table 217 and temperature profile data 233 may be integrated into a single memory unit and/or included in a single database and/or may be accessible by a user and/or calibration unit 246. In addition or the alternative, temperature detector 104 may convert measured leakage current 110 to temperature using a predetermined formula based on the known and/or estimated resistivity of ink capsules 130 and/or other components of electrophoretic display device 102. As another example, the operations of controller pulse modulator 240 may be performed by more than one component. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. For example, new temperature 105 information may not necessarily be transmitted each time a desired reflective state included in display information 109 is transmitted. Alternatively, pulse generation unit 106 may be operable to request new temperature information 105 from temperature detector 104 based on any number of appropriate conditions. Additionally, steps may be performed in any suitable order. For example, display input 108 may be capable of transmitting multiple sets of display information 109 that each include various desired reflective states and/or pulse generation unit 106 may store such information and/or display data in a buffer before, during, or while pulses 107 are being generated.

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more non-transitory, tangible, computer-readable, and/or computer-executable storage media. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Components of the systems and apparatuses may be coupled by any suitable communication network. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. An apparatus comprising:
 a temperature detector coupled to a conductive layer and a grounding layer of an electrophoretic display device, the temperature detector operable to:
  measure a leakage current from the conductive layer to the grounding layer that is responsive to a temperature associated with the electrophoretic device; and
  determine the temperature associated with the electrophoretic device based at least in part on the measured leakage current; and
 a switch coupled to the temperature detector, the switch operable to control the temperature detector to cease measuring the leakage current when the electrophoretic display device is undergoing a change of a reflective state.

2. The apparatus of claim 1, further comprising:
a pulse modulator coupled to the electrophoretic display device and operable to attain a desired reflective state by applying a pulse having a duration to the conductive layer of the electrophoretic display device, the duration of the pulse determined at least in part on the desired reflective state of the electrophoretic display device and the determined temperature.

3. The apparatus of claim 1, further comprising:
a humidity sensor coupled to the electrophoretic display device, the humidity sensor operable to measure a humidity associated with the electrophoretic device; and
the temperature detector further operable to determine the temperature based at least in part on the humidity.

4. The apparatus of claim 1, further comprising:
a memory coupled to the temperature detector, the memory operable to store a temperature lookup table that correlates each of a plurality of temperatures to one of a plurality of leakage currents;
wherein the temperature detector is configured to determine the temperature associated with the electrophoretic device based on a correlation between the measured leakage current and one of the plurality of temperatures stored in the temperature lookup table in the memory.

5. The apparatus of claim 2, further comprising:
a memory coupled to the temperature detector, the memory operable to store a pulse duration lookup table that correlates each of a plurality of pulse durations to at least one of a plurality of desired reflective states and at least one of a plurality of temperatures; and
wherein the pulse modulator is configured to determine the duration of the pulse applied to the electrophoretic display based on a correlation between the determined temperature, the desired reflective state of the electrophoretic display and one of the plurality of pulse durations stored in the pulse duration lookup table in the memory.

6. The apparatus of claim 1:
wherein the electrophoretic display device comprises a plurality of temperature zones; and
wherein the temperature detector is one of a plurality of temperature detectors, each temperature detector coupled to the conductive layer and the grounding layer of the electrophoretic display device within one of the plurality of zones and operable to determine a temperature associated with its associated temperature zone.

7. The apparatus of claim 4, further comprising a calibration unit coupled to the memory and operable to:
measure a plurality of leakage currents from the conductive layer to the grounding layer at each of a plurality of temperatures measured by the calibration unit;
correlate each of the plurality of leakage currents with each of the plurality of temperatures; and
store the correlated leakage currents and temperatures in the temperature lookup table in the memory.

8. A method comprising:
measuring a leakage current from a conductive layer to a grounding layer of an electrophoretic display device using a temperature detector coupled to the conductive layer and the grounding layer of the electrophoretic display device, the measured leakage current responsive to a temperature associated with the electrophoretic device;
determining, with the temperature detector, the temperature associated with the electrophoretic device based at least in part on the measured leakage current; and
ceasing measuring the leakage current when the electrophoretic display device is undergoing a change of a reflective state using a switch coupled to the temperature detector.

9. The method of claim 8, further comprising:
attaining a desired reflective state by applying a pulse having a duration to the conductive layer of the electrophoretic display device using a pulse modulator coupled to the electrophoretic display device, the duration of the pulse determined at least in part on the desired reflective state of the electrophoretic display device and the determined temperature.

10. The method of claim 8, further comprising:
measuring a humidity associated with the electrophoretic device using a humidity sensor coupled to the electrophoretic display device; and
determining the temperature based at least in part on the humidity using the temperature detector.

11. The method of claim 8, further comprising:
storing a temperature lookup table in a memory coupled to the temperature detector, the temperature lookup table correlating each of a plurality of temperatures to each of a plurality of leakage currents.

12. The method of claim 8, further comprising:
storing a pulse duration lookup table in a memory coupled to the temperature detector, wherein each of a plurality of pulse durations is a function of at least one of a plurality of desired reflective states and at least one of a plurality of temperatures.

13. The method of claim 8,
wherein the electrophoretic display device comprises a plurality of temperature zones;
wherein the temperature detector is one of a plurality of temperature detectors, each temperature detector coupled to the conductive layer and the grounding layer of the electrophoretic display device within one of the plurality of zones; and
wherein the method further comprises determining a temperature associated with each one of the plurality of temperature zones using the temperature detector associated with each temperature zone.

14. The method of claim 11, further comprising:
measuring, with a calibration unit coupled to the memory, a plurality of leakage currents from the conductive layer to the grounding layer at each of a plurality of temperatures measured by the calibration unit;
correlating, with the calibration unit, each of the plurality of leakage currents with each of the plurality of temperatures; and
storing the correlated leakage currents and temperatures in the temperature lookup table in the memory.

15. An apparatus comprising:
a temperature detector coupled to a conductive layer of an electrophoretic display device, the temperature detector operable to:
measure a leakage current that is responsive to a temperature associated with the electrophoretic device;
determine the temperature associated with the electrophoretic device based at least in part on the measured leakage current; and
determine the temperature based at least in part on a humidity associated with the electrophoretic device;
a pulse modulator coupled to the electrophoretic display device and operable to attain a desired reflective state by applying a pulse having a duration to the conductive layer of the electrophoretic display device, the duration of the pulse determined at least in part on the desired reflective state of the electrophoretic display device and the determined temperature;

a humidity sensor coupled to the electrophoretic display device, the humidity sensor operable to measure the humidity associated with the electrophoretic device; and a switch coupled to the temperature detector, the switch operable to cease measuring the leakage current when the electrophoretic display device is undergoing a change of a reflective state.

16. The apparatus of claim 15, further comprising:

a memory coupled to the temperature detector, the memory operable to store a temperature lookup table that correlates each of a plurality of temperatures to each of a plurality of leakage currents;

wherein the temperature detector is configured to determine the temperature associated with the electrophoretic device based on a correlation between the measured leakage current and one of the plurality of temperatures stored in the temperature lookup table in the memory.

17. The apparatus of claim 15, further comprising:

a memory coupled to the temperature detector, the memory operable to store a pulse duration lookup table that includes a plurality of pulse durations, wherein each of the plurality of pulse durations is a function of at least one of a plurality of desired reflective states and at least one of a plurality of temperatures, and wherein the pulse modulator is configured to determine the duration of the pulse applied to the electrophoretic display based on a correlation between the determined temperature, the desired reflective state of the electrophoretic display and one of the plurality of pulse durations stored in the pulse duration lookup table in the memory.

18. The apparatus of claim 15:

wherein the electrophoretic display device comprises a plurality of temperature zones; and wherein the temperature detector is one of a plurality of temperature detectors, each temperature detector coupled to the conductive layer and the grounding layer of the electrophoretic display device within one of the plurality of zones and operable to determine a temperature associated with its associated temperature zone.

* * * * *